United States Patent Office.

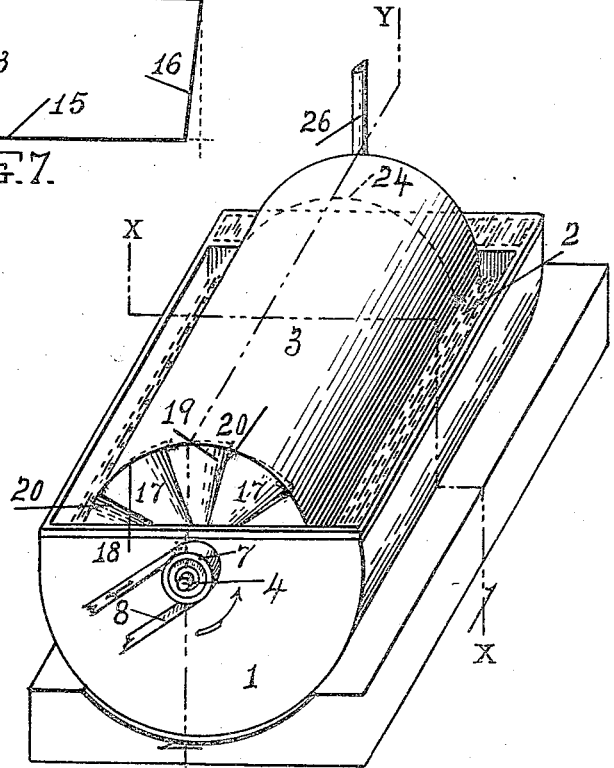

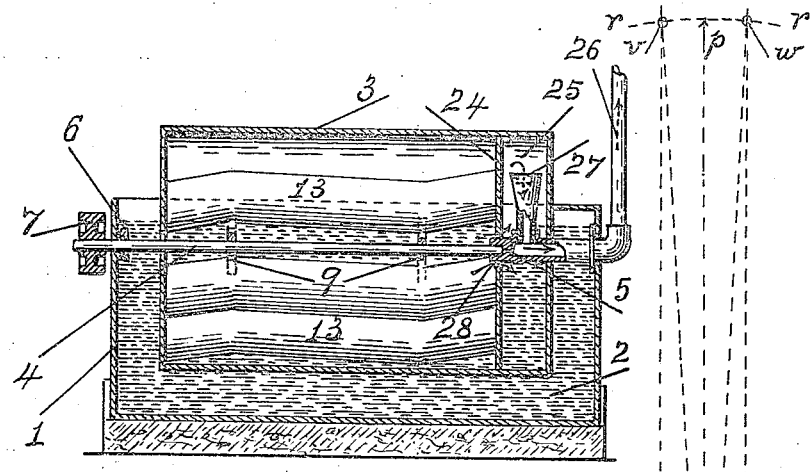
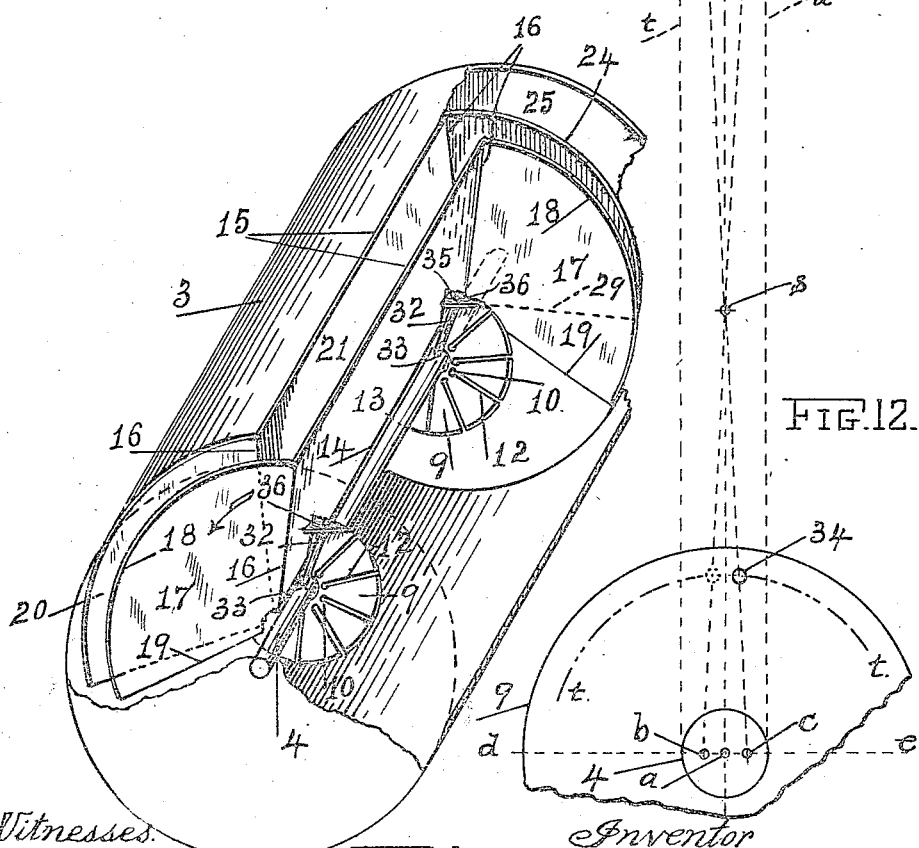

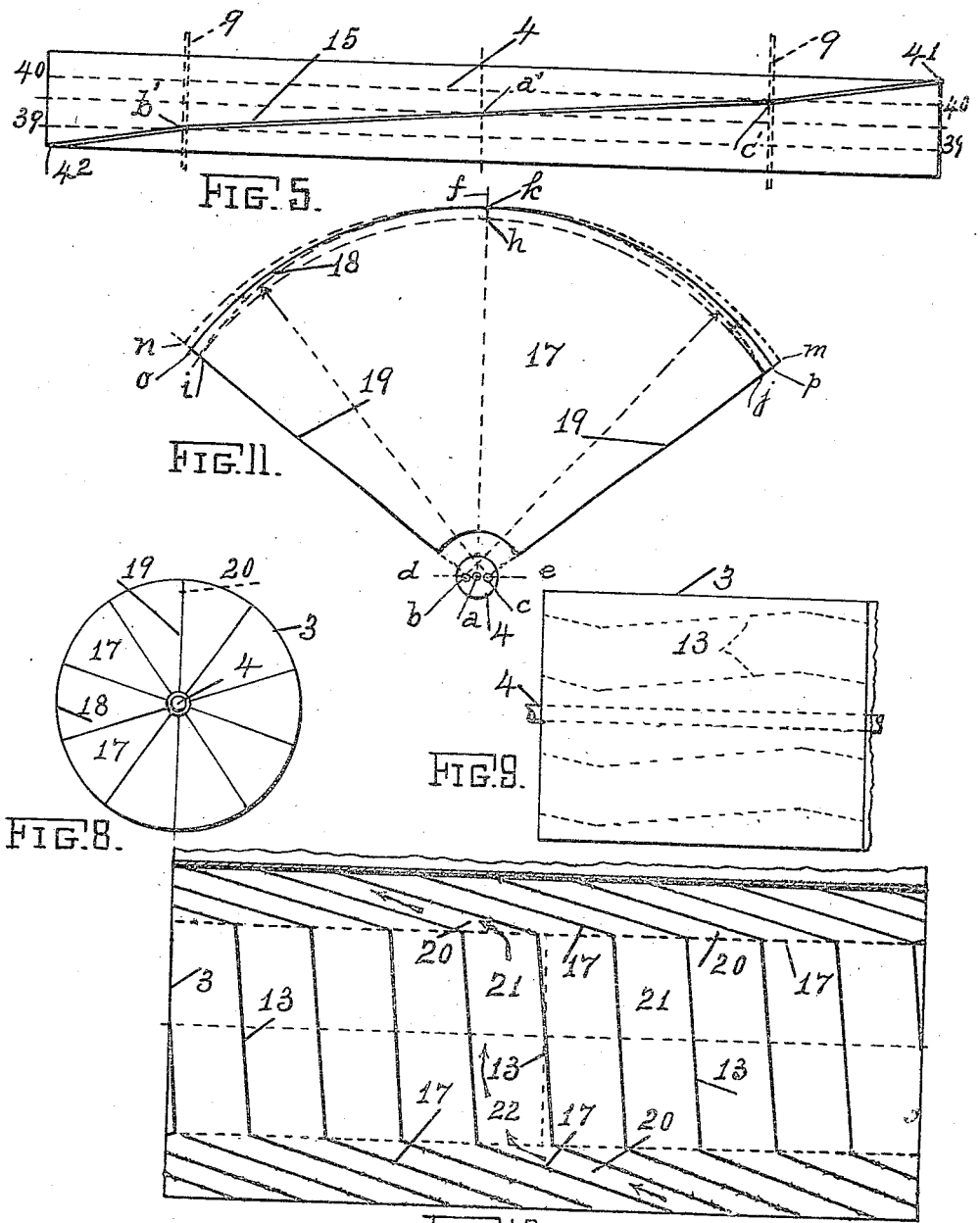

HANS C. AARUP, OF SPRINGFIELD, ILLINOIS.

AIR COMPRESSOR.

1,422,070.   Specification of Letters Patent.   Patented July 11, 1922.

Application filed September 25, 1919. Serial No. 326,240.

*To all whom it may concern:*

Be it known that I, HANS C. AARUP, a citizen of the United States, residing in Springfield, in the county of Sangamon and State of Illinois, have invented a new and useful Air Compressor, of which the following is a specification.

The invention relates to air compressors of a type in which a rotative element compresses a measured volume of air against the head of a volume of water with which the volume of air being compressed is in contact.

The broad purpose of the invention is to provide means whereby measured quantities of air may be compressed in succession and the successive increments of air may be mingled with hydro-carbons such as gasoline, acetylene gas, etc., to enrich them according to the purposes for which they are to be used, said enrichment being synchronous to the use; to the end that the gas may be carbureted only when and as fast as it is being used and to an extent specially suitable for the specific use. More specific purposes of the invention are: to provide compression devices adapted to measure and compress successive measured volumes of air in opposition to the head of a volume of water opposed to the measured volume of air; to provide a compressor cylinder having intake openings, blades, wings and outlet openings in such relation to each other that air admitted through the inlet openings will be pocketed within the cylinder and upon rotation of the cylinder will be compressed against the body of water in the cylinder and will be discharged through the outlet openings; to provide means to determine the position of the blades relative to each other; to provide a container for the compressed air in conjunction with means for conveying the compressed air to the place where it is to be used, and to provide improved structural details.

The invention is illustrated in the annexed drawings to which reference is hereby made and will now be fully described and claimed.

Figure 1 is a perspective view of an air compressor embodying my invention; Fig. 2 is a vertical transverse section taken on the line X. X. of Fig. 1; Fig. 3 is a vertical longitudinal section taken on the line Y. Y. of Fig. 1; Fig. 4 is an enlarged diagrammatic view partly in section showing two blades and the pairs of wings connected with the respective blades, assembled in the cylinder; Fig. 5 is a diagram on an enlarged scale showing the form of one blade when in place in the cylinder and the position of the blade relative to the axis of the cylinder shaft; Fig. 6 is an enlarged elevation of one of the spiders which support the blades in proper relation to the cylinder shaft; Fig. 7 is an enlarged elevation of one blade, detached; Fig. 8 is a diagram showing in elevation the front end of the detached compressor cylinder; Fig. 9 is a diagram showing a side elevation of the detached compressor cylinder; Fig. 10 is a diagram based on Figs. 8 and 9, and showing on a reduced scale, a developed plan of so much of the compressor cylinder, shown in Figs. 1 and 2, as is necessary to show the position of the blades and wings relative to the circumferential wall of the cylinder and their position relative to each other; Fig. 11 is an enlarged elevation of one detached wing; and Fig. 12 is a diagram illustrating the mode of laying out the spiders on a flat sheet of metal. The same reference numerals designate the same parts in all the views.

The air compressor herein set forth is primarily designed for use in shops employing hydro-carbons in various processes of manufacture and in practice the machines will be made in various sizes and of various capacities suited to the various purposes for which they are to be used. The smaller size machines will preferably be portable in order that they may be moved from place to place, as may be found convenient in practice; but larger machines may be stationary and may, within scope of my invention, be designed with reference to special locations and special uses.

I have shown and will describe a machine made mainly of sheet metal, but any other suitable material may be used.

A tank 1 of any suitable form contains a volume of water 2 in which the cylinder—designated as a whole by the numeral 3—rotates. A shaft 4 co-axial with the cylinder extends the greater part of the length of the cylinder and through one end of the tank. The shaft is rotative in a stationary bearing 5 (Fig. 3) and a stuffing box 6, which prevents leakage of water around the shaft. A pulley 7 is fixed on the shaft. The shaft may be rotated by a belt 8 running on the pulley, or may be rotated by any other suitable means.

The cylinder includes a number of parts which it will be necessary to describe separately.

A plurality of spiders 9, (in the present instance two) are permanently attached to the shaft 4 at right angles to the shaft.

Each spider has a series of perforations 10, through which water may pass, and a series of radial slits 12 to accommodate a corresponding series of blades 13. In the present instance there are ten blades each occupying two slits, one in each spider, but a greater or a less number of blades may be used; and in that case each spider will have a greater or a less number of slits, according to the number of blades. By experiment I have found that ten blades in a series give good results in small size and medium size machines. In larger machines I prefer to use a larger number of blades varying according to circumstances.

Each blade 13 (Figs. 3, 4 and 7) has parallel longitudinal edges 14 and 15 and oppositely inclined terminal edges 16. When the blades are in place in the cylinder their longer edges 14 will lie in the perforations 10 of the spiders 9 (Fig. 4) and their shorter edges 15 will be permanently attached to the curved inner wall of the cylinder.

The wings 17 (Figs. 1 and 11) are all alike. Each wing has an arcuate edge 18 and inwardly converged edges 19. The length of each arc 18 is in the present instance approximately three tenths the circumference of the cylinder. Two wings 17 are permanently attached to each blade 13 along its inclined edges 16, one wing at each end of the blade, as clearly shown in Figs. 4 and 10. The wings overlap each other to form passages 20 communicating with the chambers 21 between the blades 13. The wings 17 overlap each other and converge from the circumference of the cylinder towards the shaft 4 and the arcuate edge 18 of each wing is permanently attached to the circumferential shell of the cylinder. The wings 17, at the rear end of the cylinder overlap each other and the radial edge of each wing is soldered on the face of the next adjacent wing, as indicated by the dotted line 29 in Fig. 4, and the united rear wings constitute the circular partition wall designated as a whole by the numeral 24, and shown conventionally, but not in detail, in Figs. 1, 3 and 4. Between the partition 24 and the end wall of the cylinder is a receiving chamber or container 25, in communication with the interior of the cylinder through the central opening 28. Air compressed by the blades in conjunction with the water in the cylinder, passes through the opening 28 (Fig. 3) into the container. An inwardly opening valve 27 communicates with the pipe 26 which conducts the compressed air to the place of use.

In order that the radial inwardly converged edges 19 of any wing may not project beyond the front end of the cylinder it is necessary to shape the wings so that the entire length of the arc 18 of each wing will be in contact with the inner surface of the cylindrical shell of the cylinder. This result is accomplished in a way which I will now describe.

To lay out a wing (Fig. 11) on a flat sheet of metal, three datum points or centres, $a$, $b$, and $c$, will be used. All the centres are in the straight line $d.\,e$. Each of the centres $b$ and $c$ is spaced apart from centre $a$, a distance equal to half the radius of the shaft 4. A line $a.\,f$. will be drawn through the centre $a$, at right angles to the line $d.\,e$. With $a$, as a centre and a radius $a.\,h$. equal to the true radius of the inside of the cylinder 3, an arc $i.\,h.\,j$. will be drawn, the length of the arc being three tenths of the inside circumference of the cylinder. With $c$ as a centre and with a radius equal to $c.\,i$. the arc $i.\,k.\,m$. will be drawn; and with $b$, as a centre and a radius equal to $b.\,j.$, an arc $j.\,k.\,n$. will be drawn; then with $a$ as a centre and with the radius $a.\,k.$ the arc $o.\,k.\,p$. will be drawn and said arc will be the true arc 18 of the wing.

I have found by experiment that blades 13, which are inclined relative to the axis of the shaft 4 and have a very slight spiral twist, as indicated in Fig. 5, operate very effectively. The inclination and twist of the blades is attained by securing the spiders on the shaft in such relation to each other that the two slits 12, one in each spider, in which any given blade rests, will not lie in one and the same plane including the axis of the shaft, but one slit will be inclined in one direction away from said plane and the other slit will be inclined in the opposite direction away from the plane. The position of each spider 9 is determined by a rod 32 (Fig. 4) passing through a hole 33 transverse to the shaft 4 and engaging in a hole 34 or 35, as the case may be, in an ear 36 on the spider. The deflection of the blades, just a little more than the thickness of the sheet metal, is so slight that it would be very difficult to drill the holes 34 out of line but still in position to admit of the slight deflection of the blades relative to the axis of the shaft. I have therefore devised and used the expedient of boring the holes straight through the shaft in line with each other, the axes of the holes being in one and the same plane with the longitudinal axis of the shaft; and embodying in the spiders themselves means now to be described, whereby the position of the spiders relative to each other may be accurately determined.

Each spider has two holes 34 and 35 in a diametrical line 37 extending through the centres of both holes and through the centre of the spider. The hole 34 is on one side of a slit 12, and the hole 35 is on the opposite side of another slit which is in line with said first named slit, as clearly shown in Fig. 6. The positions of the centres of the holes 34 and 35 are directly referable to the datum points $b$, $a$ and $c$ shown in Figs. 4, 5, and 11 and used in determining the inclination of the blades relative to the axis of the shaft; in determining the outward curvature of the terminal members of the blades; and in determining the arcs 18 of the wings 17 as already described. The point $a'$ is in the axis of the shaft, the point $b'$ is in a first datum line 39, 39, (Fig. 5) parallel to the axis of the shaft and lying in a plane $d.$ $e.$ (Figs. 11 and 12) diametral to the shaft, and the point $c'$ is in a second datum line 40, 40 parallel to the axis of the shaft and lying in the same plane. Each of the datum lines 39, 39 and 40, 40, is spaced apart from the axis of the shaft a distance equal to half of the radius of the shaft. The spiders 9 are equidistant from the point $a'$ and are at right angles to the axis of the shaft. One spider intersects the datum line, 39, 39 at the point $b'$, and the other spider intersects the datum line 40, 40 at the point $c'$, and the line $b'$, $a'$ $c'$ is the line of inclination of that part of the outer edge 15 of the blade which is between the spiders. The points 41 and 42 are at the terminals of respective diameters of the shaft, and the line $c'$. 41, represents the outward curvature of the outer edge of one terminal-member of the blade; and the line $b'$, 42 represents the outward curvature of the outer edge of the other terminal-member of the blade. From the foregoing it will be seen that the inclination of each blade 13 relative to the axis of the shaft and the curvature of the terminal-members of the blades are directly referable to the centres $b$, $a$ and $c$ shown in Figs. 6, 11 and 12.

I have found by experiment that the described interrelation of the elements of the mechanism exists, and may be advantageously used in designing machines of different sizes.

To lay out a spider on the metal sheet (Fig. 12) a circle will be drawn with $a$, as a centre, outlining the shaft 4; with the same centre another circle outlining the spider 9 will be drawn, and with the same centre and with a radius $a.$ $p.$ approximately equal to the diameter of the cylinder 3, the indefinite arc $r.$ $r.$ will be drawn.

Lines $t$ and $u$ drawn perpendicular to the lines $d.$ $e.$ at the respective terminals of the diameter of the circle 4 will intersect the arc $r.$ $r.$ at the respective points $v$ and $w$. Lines $b.$ $w.$ and $c.$ $v.$ will be drawn and will intersect at the point $s$. I have found by experiment that the distance $a.$ $s.$ is a fairly accurate gauge of a desirable depth of water in the tank in which the cylinder rotates. With $a$, as a centre the indefinite arc $t.$ $t.$ will be drawn inside the circle 9 a sufficient distance to admit of safe metal around the holes 34 and 35. The intersection of the arc $t.$ $t.$ and the line $c.$ $v.$ will be the centre of the hole 34 and the centre of the hole 35 will be at the point at which a diametral line 38 through the centre $a$, and through the centre of the hole 34, intersects a continuation of the arc $t.$ $t.$ as shown in Fig. 6.

Radial dotted lines will be drawn to locate the respective slits 12, of the hole 35. The metal will then be bent along the dotted lines 37 to form ears 36 at right angles to the face of the spider.

Operation.

That end of the machine which is shown at the front in Fig. 1 will be treated as its front end and the operation will be described as viewed from the front.

Counter-clock-wise rotation of the shaft 4 will be effected by the belt 8 driving the pulley 7, or may be effected by any other suitable means. It has already been noted that the cylinder 3 is partly submerged in water 2 in the tank 1; that two wings are permanently attached to each blade, one at each end of the blade; that the wings extend outwardly from the blade in opposite directions; that the arcuate edge 18 of each wing is permanently attached to the inner circular wall of the cylinder and that each ring extends around the cylinder approximately three tenths of the circumference of the cylinder.

By reason of the construction recited it follows that if the air intake opening 20 be above the water level as shown in Fig. 1, the other end of the chamber 21 with which that opening communicates, being in advance (to the left) of the intake opening 20, to an extent equal to three tenths of the circumference of the cylinder, as indicated by arrows 22 in Fig. 10; the greater part of the chamber 21 with which that particular intake opening 20 communicates will be submerged. The chamber 21 being in communication with the interior of the tank will contain water at the level of the water in the tank, and all that part of the chamber 21 which is above the water level will be available to contain air. The cylinder being attached to the shaft will rotate with it.

Referring to Fig. 2, it will be noted that the left-hand front wing nearest the water is partly immersed in the water, the water level being indicated by the broken line 30. 30. and the air space in the chamber being indicated by the dotted line 31. The rear end of each chamber 21 is closed and the inner longitudinal edges 14 of the converged blades 13 which form the side walls of the chamber are very close together, forming a narrow slit 23 through which only a small quantity of water can flow during the limited time that the cylinder is making approximately three tenths of a revolution.

During a rotation of the cylinder the volume of water entering the chamber through the inlet opening 20 will exceed the quantity that can go out through the slit 23 and the air trapped between the volume of water originally in the chamber and the constantly increasing volume of water entering through the intake opening 20 will be compressed by the forced inflowing volume of water, and the compressed air will glide rearward along the blades 13 until the chamber occupies such a position that the slit 23, which was originally at the lowest longitudinal level of the chamber will, owing to the rotation of the cylinder, have become the highest longitudinal level of the chamber, and the compressed air, seeking always the highest level, will pass outward through the central opening 28 into the container 25 and will pass through the inwardly opening check valve 27 and enter the pipe 26 by which it will be conveyed to the place where it is to be used. In like manner all the chambers 21 will, in succession, come into use and the successive measured quantities of air will be compressed and the compressed air will be delivered into the container 25, whence they will go through the valve 27 and the pipe 26 to the place of use.

Having fully described my invention, what I claim as new and desire to secure by Letters Patent is:

In an air compressor, the combination of a rotative shaft; spiders having radial slits and perforated ears; pins extending through the perforations in the ears of the spiders and through the shaft and connecting the spiders with the shaft in such relation thereto that the radial slits of the respective spiders will be uniformly out of line; blades supported in the radial slits of the spiders and separated by narrow spaces between the inner longitudinal edges of the blades; wings united to the respective blades; and a cylindrical shell united to the blades and the wings.

In witness whereof I have hereunto signed my name at Springfield, Illinois, this 20th day of September, A. D. 1919.

HANS C. AARUP.

Witnesses:
J. S. THOMPSON,
N. DU BOIS.